US011623595B2

(12) United States Patent
Miotani

(10) Patent No.: US 11,623,595 B2
(45) Date of Patent: Apr. 11, 2023

(54) VEHICLE CUSHIONING MEMBER

(71) Applicant: KASAI KOGYO CO., LTD., Kanagawa (JP)

(72) Inventor: Shinsuke Miotani, Nagoya (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 135 days.

(21) Appl. No.: 17/414,792

(22) PCT Filed: Oct. 10, 2019

(86) PCT No.: PCT/JP2019/040021
§ 371 (c)(1),
(2) Date: Jun. 16, 2021

(87) PCT Pub. No.: WO2021/070327
PCT Pub. Date: Apr. 15, 2021

(65) Prior Publication Data
US 2022/0017033 A1    Jan. 20, 2022

(51) Int. Cl.
*B60R 21/04*    (2006.01)

(52) U.S. Cl.
CPC .. *B60R 21/0428* (2013.01); *B60R 2021/0414* (2013.01); *B60R 2021/0435* (2013.01)

(58) Field of Classification Search
CPC .... B60R 21/0428; B60R 19/34; B60J 5/0451; B60J 5/0461
See application file for complete search history.

(56) References Cited

U.S. PATENT DOCUMENTS

| 8,430,437 B2 * | 4/2013 | Asakawa | B60R 19/34 |
| | | | 293/133 |
| 2015/0123426 A1 * | 5/2015 | Steinbrecher | B60J 5/0451 |
| | | | 296/187.03 |

(Continued)

FOREIGN PATENT DOCUMENTS

| BR | 202016011922 U2 * | 12/2017 | |
| DE | 102014217031 A1 * | 3/2015 | ............. B60R 19/03 |

(Continued)

OTHER PUBLICATIONS

International Search Report for International Application No. PCT/JP2019/040021 dated Dec. 17, 2019, Japan, 2 pages.

*Primary Examiner* — D Glenn Dayoan
*Assistant Examiner* — Kevin P Weldon
(74) *Attorney, Agent, or Firm* — United IP Counselors, LLC

(57) ABSTRACT

A vehicle cushioning member includes first and second bending portions including first and second convex-bending portions, and first and second concave-bending portions. The first and second convex-bending portions and the first and second concave-bending portions are formed perimetrically while switched from each other between the adjacent side walls. When a length from a top surface of the top plate to a flange portion is 100%, a length from the top surface to the first bending portion is 24% or more and 47% or less, a length from the first bending portion to the second bending portion is 34% or more and 49% or less, and a length from the second bending portion to a top-plate-side surface of the flange portion is 13% or more and 33% or less, concerning a height direction along the axis of a substantially polygonal tube.

4 Claims, 14 Drawing Sheets

(56) References Cited

U.S. PATENT DOCUMENTS

| | | |
|---|---|---|
| 2015/0298637 A1 | 10/2015 | Hase et al. |
| 2020/0108788 A1* | 4/2020 | Sportelli ................. B60R 19/03 |
| 2020/0369230 A1* | 11/2020 | Ginja ...................... B60R 19/18 |

FOREIGN PATENT DOCUMENTS

| | | |
|---|---|---|
| EP | 0795430 A2 * | 9/1997 |
| JP | H10-278709 A | 10/1998 |
| JP | 2007-055173 A | 3/2007 |
| JP | 2011-225164 A | 11/2011 |
| JP | 2014-121887 A | 7/2014 |
| JP | 2016-090011 A | 5/2016 |
| JP | 2017-136965 A | 8/2017 |
| JP | 2017-170967 A | 9/2017 |

* cited by examiner

VEHICLE CUSHIONING MEMBER

CROSS-REFERENCE TO RELATED APPLICATIONS

This application is a National Stage Entry application of PCT International Application No. PCT/JP2019/040021, filed on Oct. 10, 2019, the entire contents of which are hereby incorporated by reference.

BACKGROUND

1. Technical Field

The present invention relates to a vehicle cushioning member.

2. Description of the Background

A conventionally proposed vehicle cushioning member is arranged at a back surface of a trim member. The trim member is attached so as to cover a vehicle body panel. The vehicle cushioning member absorbs collision energy when receiving collision force. The vehicle cushioning member includes a top plate and a plurality of side walls (Japanese Patent Application Laid-open Publication No. 2014-121887 (hereinafter referred to as "Patent Literature 1"), and Japanese Patent Application Laid-open Publication No. 2017-136965 (hereinafter referred to as "Patent Literature 2"), for example). The top plate forms a surface for receiving collision force. A plurality of the side walls are formed so as to extend from a perimeter edge portion of the top plate, and are arranged perimetrically with respect to the top plate. Further, one among such vehicle cushioning members includes an outward bending line and an inward bending line that are formed on the side walls. For this reason, when the top plate receives collision force, the vehicle cushioning member is easily bent outward convexly at the outward bending line, and is easily bent inward concavely at the inward bending line. Particularly, the outward and inward bending lines are provided so that a deformed shape resulting from any force tends to be the same, and an absorption effect of collision energy can be stabilized.

BRIEF SUMMARY

Here, the vehicle cushioning member is desired to have a predetermined force-and-stroke-amount (F-S) characteristic. FIG. 14 represents an F-S characteristic of a vehicle cushioning member according to a comparative example. The vehicle cushioning member according to the comparative example can achieve a stable fracture mode at the time of side collision. However, absorption force tends to become a peak P at an early phase (i.e., at a small stroke) and next decrease toward a bottom-reaching waveform, as represented in FIG. 14.

Here, an upper limit of force is set for an F-S characteristic. A vehicle cushioning member is desired to have an F-S characteristic of absorbing arbitrary energy within a range not exceeding this upper limit. Meanwhile, a vehicle cushioning member is desired to absorb a large amount of impact energy (i.e., to have an F-S characteristic whose integrated value is large). Securing of a sufficient stroke amount is difficult particularly in small automobiles and the like. Thus, an expectation for an F-S characteristic made close to the upper limit to compensate this difficulty has increased.

However, the vehicle cushioning member according to the comparative example is unable to meet the expectation for the F-S characteristic because of having a tendency that force (F) decreases after a stroke (S) goes beyond the peak P. A countermeasure against these matters has been only an enlargement of a pad, resulting in narrowing a vehicle interior space.

The present invention has been made in view of such circumstances. An object of the present invention is to provide a vehicle cushioning member capable of securing a larger amount of impact absorption by a smaller stroke amount.

In order to accomplish the above object, a vehicle cushioning member according to the present invention has a shape of a substantially polygonal tube and is arranged at a back surface of a trim member, the trim member being attached so as to cover a vehicle body panel, the vehicle cushioning member including:

a top plate forming a top surface for receiving collision force;

a plurality of side walls that are formed so as to extend from a perimeter edge portion of the top plate and that are arranged perimetrically with respect to the top plate; and a plate-shaped flange portion projecting outward from respective end portions of the plurality of side walls, the end portions being positioned on an opposite side of the top plate;

wherein the vehicle cushioning member absorbs collision energy when the top plate receives collision force, wherein the side walls included in the plurality of side walls and adjacent to each other include central portions substantially perpendicular to each other in a section substantially parallel to the top plate, the plurality of side walls include:

a first bending portion including a first convex-bending portion and a first concave-bending portion, the first convex-bending portion stimulating outward convex bending of the side wall when the top plate receives collision force, the first concave-bending portion stimulating inward concave bending of the side wall when the top plate receives collision force, the first convex-bending portion and the first concave-bending portion being formed perimetrically while switched from each other between the side walls adjacent to each other; and a second bending portion including a second convex-bending portion and a second concave-bending portion, the second convex-bending portion stimulating outward convex bending of the side wall when the top plate receives collision force, the second concave-bending portion stimulating inward concave bending of the side wall when the top plate receives collision force, the second convex-bending portion and the second concave-bending portion being formed perimetrically while switched from each other between the side walls adjacent to each other, the first convex-bending portion and the second concave-bending portion are formed at the same side wall, and the first concave-bending portion and the second convex-bending portion are formed at the same side wall, when a length from the top surface of the top plate to a surface belonging to the flange portion and positioned on a side of the top plate is 100%, a length from the top surface to the first bending portion is set to be equal to or larger than 24% and equal to or smaller than 47%, a length from the first bending portion to the second bending portion is set to be equal to or larger than 34% and equal to or smaller than 49%, and a length from the second bending portion to the surface belonging to the flange portion and positioned on the side of the top plate is set to be equal to or larger than 13% and equal to or smaller than 33%, concerning a height direction along an axis of the substantially polygonal tube.

According to the present invention, when the length from the top surface of the top plate to the surface belonging to the flange portion and positioned on the side of the top plate is 100%, the length from the top surface to the first bending portion is set to be equal to or larger than 24% and equal to or smaller than 47%, the length from the first bending portion to the second bending portion is set to be equal to or larger than 34% and equal to or smaller than 49%, and the length from the second bending portion to the surface belonging to the flange portion and positioned on the side of the top plate is set to be equal to or larger than 13% and equal to or smaller than 33%. When the top plate receives collision force, such a configuration first causes the first bending portion on a side closer to the top plate to be bent, and then causes the second bending portion on a side farther from the top plate to be bent. Thus, achievement of an ideal F-S characteristic can be facilitated. Therefore, it is possible to provide the vehicle cushioning member capable of securing a larger amount of impact absorption by a smaller stroke amount.

DETAILED DESCRIPTION

The following describes a preferred embodiment of the present invention. The present invention is not limited to the below-described embodiment, and appropriate modifications can be made without departing from the essence of the present invention. Illustrations and description of some configurations are omitted at some parts in the below description of the embodiment. Known or well-known techniques are naturally applied to details of the omitted techniques, within a range in which no contradiction occurs to the below-described matters.

Figure 1:
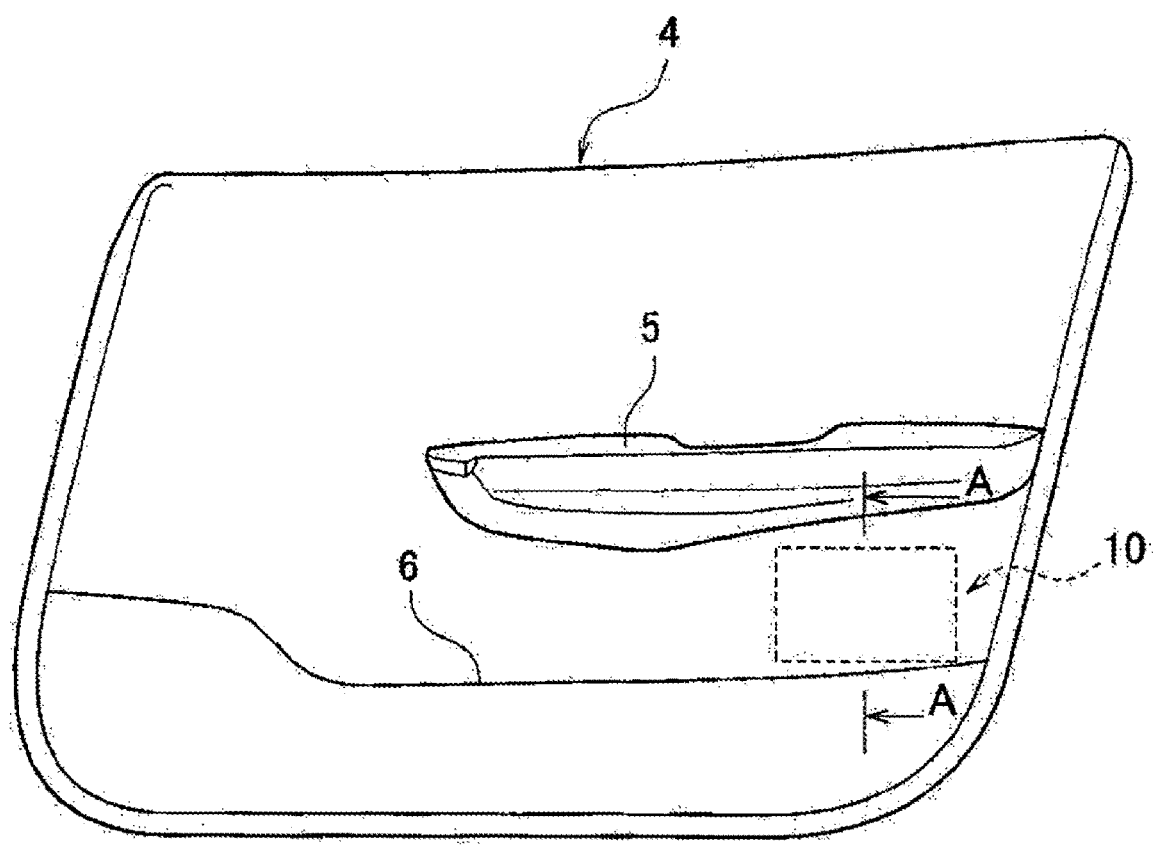
FIG. 1 is a side view schematically illustrating a door trim in an example where a vehicle cushioning member according to the present embodiment has been applied to a side door.
Figure 2:
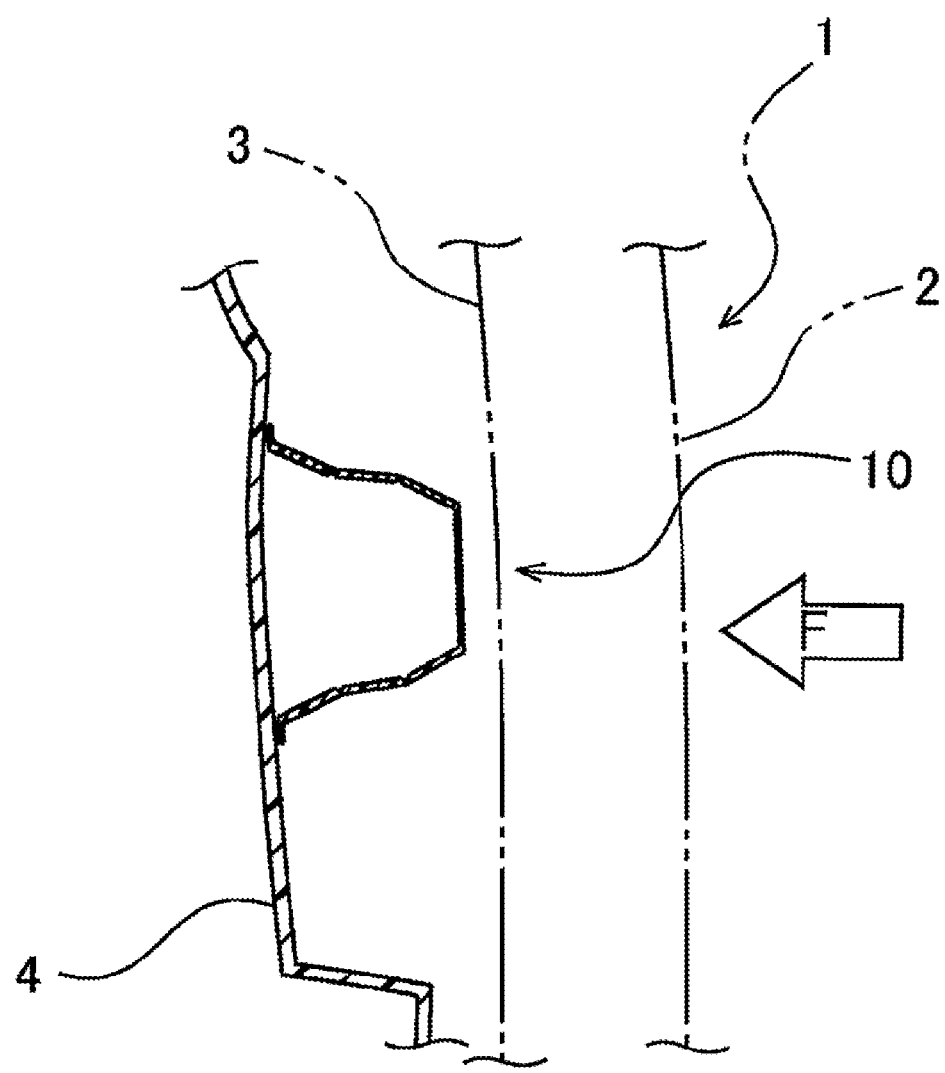
FIG. 2 is a sectional view taken along the line A-A in FIG. 1.

FIG. 1 is a side view schematically illustrating a door trim in an example where a vehicle cushioning member according to the present embodiment has been applied to a side door. FIG. 2 is a sectional view taken along the line A-A in FIG. 1.

The side door 1 is constituted by a door outer panel 2 and a door inner panel 3. The door outer panel 2 is a vehicle body panel. The door inner panel 3 constitutes a part of a wall surface panel of a vehicle interior. The door trim (trim member) 4 is attached to a side surface belonging to the door inner panel 3 and positioned on a vehicle interior side.

The door trim 4 is molded of an appropriate synthetic resin material. The door trim 4 includes a side surface (face) that is positioned on the vehicle interior side and to which a skin is adhered. The skin serves as both of a cushion and face decoration. This door trim 4 includes a door armrest 5 at its vertical-direction intermediate portion. Further, the door trim 4 includes a door pocket 6 at a position below the door armrest 5.

The vehicle cushioning member 10 having high impact-absorption ability is installed at a predetermined position of the door trim 4. An example of the predetermined position is a position corresponding to a waist of an occupant seated on a seat cushion (not illustrated).

Figure 3:
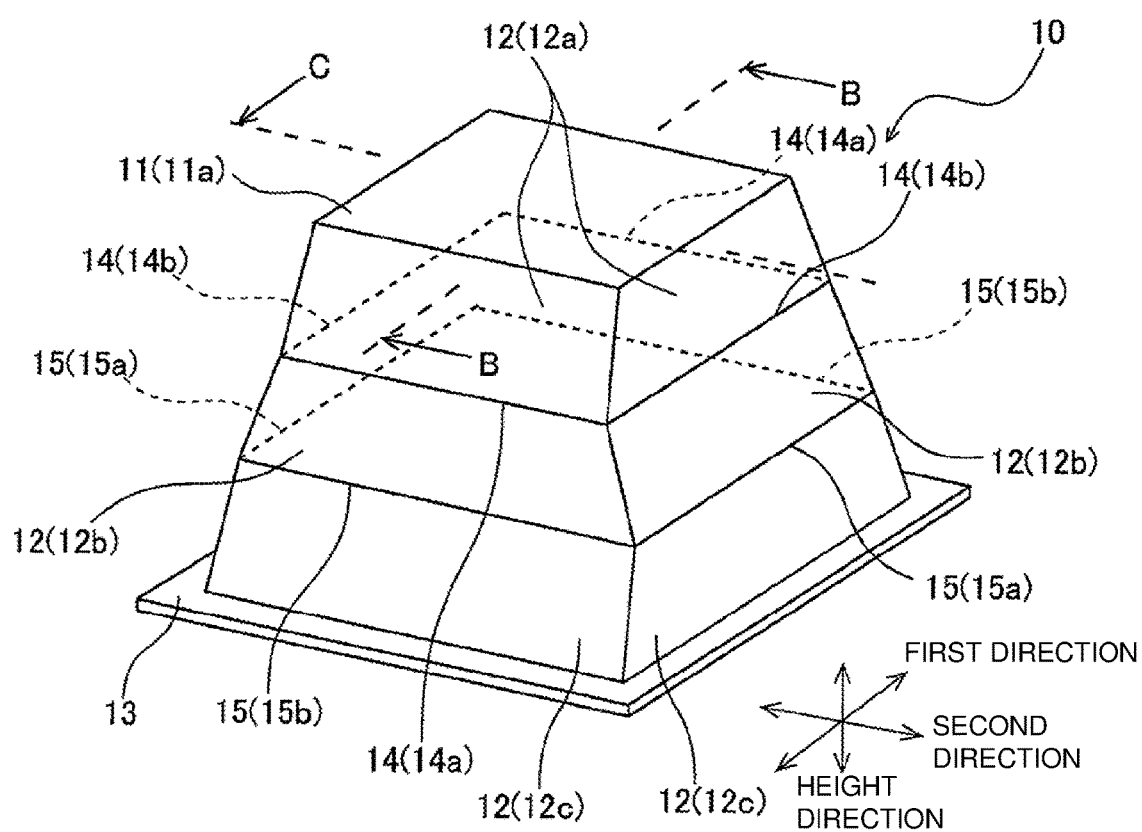
FIG. 3 is a perspective view illustrating the vehicle cushioning member illustrated in FIG. 2.

FIG. 3 is a perspective view illustrating the vehicle cushioning member 10 illustrated in FIG. 2. The vehicle cushioning member 10 is formed in a polygonal-tube shape whose one opening is closed (refer to FIG. 2). The vehicle cushioning member 10 is deformed in the tube-axis direction by receiving collision force F applied to the side door 1 at the time of side collision of the vehicle. Thereby, the vehicle cushioning member 10 absorbs collision energy. Such a vehicle cushioning member 10 includes a top plate 11, a plurality of side walls 12, and a flange portion 13. These are integrally formed of an appropriate synthetic resin material (elastomer resin or the like).

The top plate 11 forms a top surface 11a for receiving the collision force F. This top plate 11 (top surface 11a) is constituted by, for example, a flat surface substantially parallel to the door inner panel 3 (refer to FIG. 2). The top plate 11 receives, with the surface, the door inner panel 3 at the time of application of the collision force F.

A plurality of the side walls 12 are wall members that are formed so as to extend from a perimeter edge portion of the top plate 11. A plurality of the side walls 12 are arranged perimetrically with respect to the top plate 11. Specifically, the top plate 11 is a quadrilateral one in the present embodiment. Accordingly, a plurality of the side walls 12 are formed as four walls whose number is the same as that of the respective sides of the quadrilateral top plate 11. A plurality of the side walls 12 are formed so as to extend from the respective sides of the top plate 11 toward the door trim 4 (refer to FIG. 2). The side walls 12 adjacent to each other are connected to each other. As a result, the vehicle cushioning member 10 has the polygonal-tube shape whose one end side is closed and whose other end side is open.

The flange portion 13 is a plate-shaped member projecting toward an outside of the tube from sides (end portions) of a plurality of the side walls 12. These sides are positioned on an opposite side of the top plate 11. The flange portion 13 is formed on an outer side of the tube so as to have a constant width over the entire perimeter, for example. The flange portion 13 forms a surface contacting against the door trim 4. This flange portion 13 makes surface contact with a back surface of the door trim 4 when the vehicle cushioning member 10 is deformed by the collision force F. The flange portion 13 thereby disperses, via the surface, force applied to the door trim 4.

Figure 4:
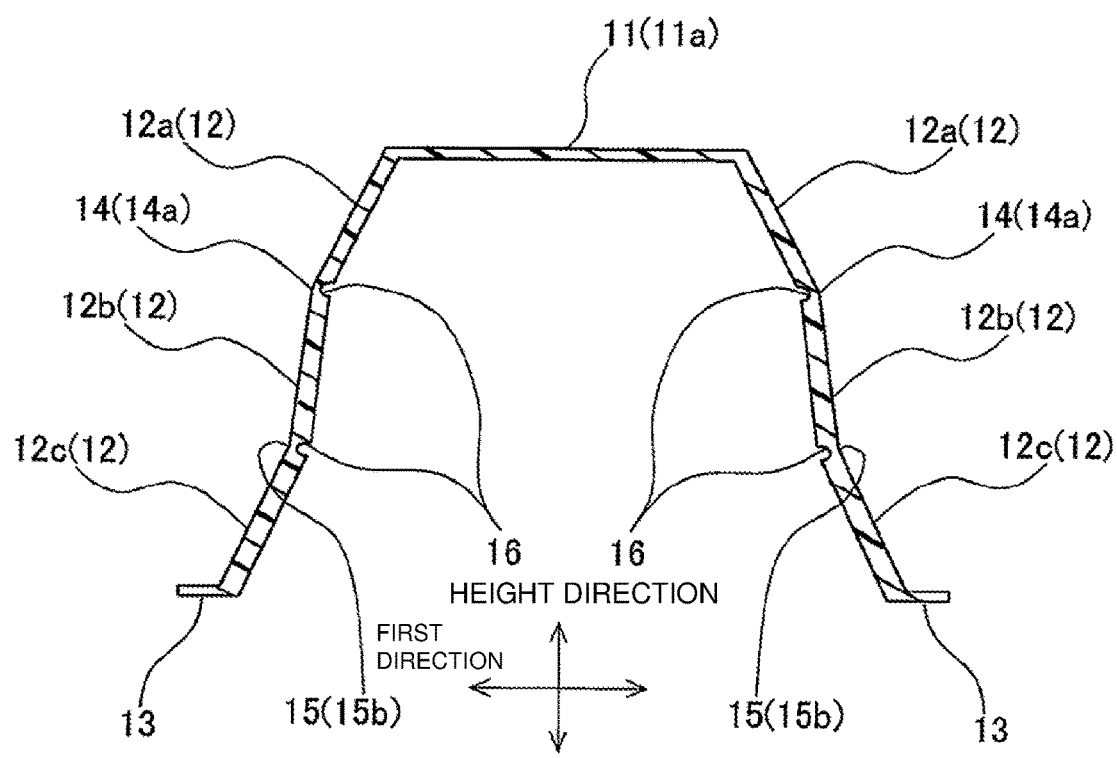
FIG. 4 is a sectional view taken along the line B-B in FIG. 3.
Figure 5:
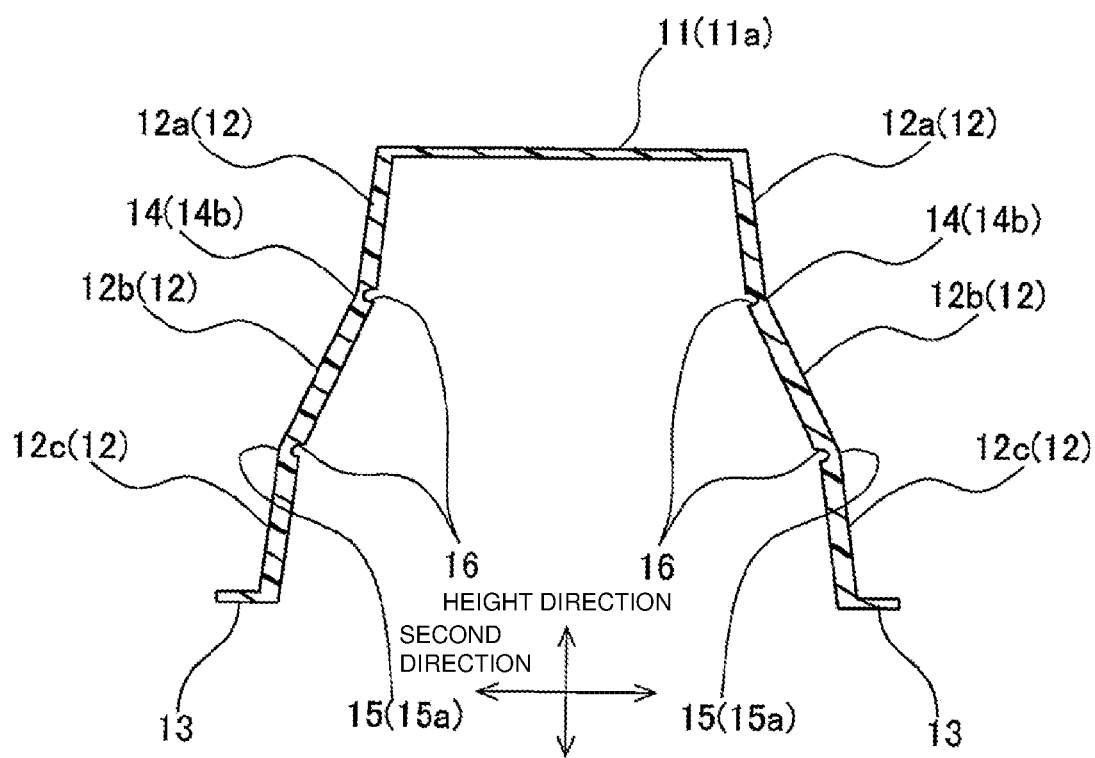
FIG. 5 is a sectional view taken along the line C-C in FIG. 3.

A plurality of the side walls 12 of the vehicle cushioning member 10 include a first bending portion 14 and a second bending portion 15 as illustrated in FIG. 3. The second bending portion 15 is positioned on a side closer to the flange portion 13 than the first bending portion 14. FIG. 4 is a sectional view taken along the line B-B in FIG. 3. FIG. 5 is a sectional view taken along the line C-C in FIG. 3.

The first bending portion 14 includes a first convex-bending portion 14a and a first concave-bending portion 14b as illustrated in FIG. 3 to FIG. 5. The first convex-bending portion 14a stimulates outward convex bending of the side wall 12 when the top plate 11 receives the collision force F. The first concave-bending portion 14b stimulates inward concave bending of the side wall 12 when the top plate 11 receives the collision force F. The first convex-bending portion 14a and the first concave-bending portion 14b are formed perimetrically (in an entire perimeter) while switched from each other between the side walls 12 adjacent to each other.

The second bending portion 15 includes a second convex-bending portion 15a and a second concave-bending portion 15b. The second convex-bending portion 15a stimulates outward convex bending of the side wall 12 when the top plate 11 receives the collision force F. The second concave-bending portion 15b stimulates inward concave bending of the side wall 12 when the top plate 11 receives the collision force F. The second convex-bending portion 15a and the second concave-bending portion 15b are formed perimetrically (in an entire perimeter) while switched from each other between the side walls 12 adjacent to each other.

The first convex-bending portion 14a and the second concave-bending portion 15b are formed at the same side wall 12. The first concave-bending portion 14b and the second convex-bending portion 15a are formed at the same side wall 12.

Here, the side wall 12 includes as a first wall 12a a portion on a side closer to the top plate 11 than the first bending portion 14, includes as a second wall 12b a portion between the first bending portion 14 and the second bending portion 15, and includes as a third wall 12c a portion on a side closer to the flange portion 13 than the second bending portion 15. In this case, angles between these are as follows.

Specifically, the first wall 12a in the side wall 12 including the first convex-bending portion 14a forms an inclination surface inclined from the normal direction of the top plate 11 (the height direction along the axis of the polygonal tube in the present embodiment) by an angle equal to or larger than 5 degrees and equal to or smaller than 30 degrees, for example. The second wall 12b in the side wall 12 including the first convex-bending portion 14a forms a perpendicular surface or inclination surface inclined from the normal direction of the top plate 11 by an angle equal to or larger than 0 degrees and equal to or smaller than 15 degrees, for example. Similarly, the second wall 12b in the side wall 12 including the second convex-bending portion 15a forms an inclination surface inclined from the normal direction of the top plate 11 by an angle equal to or larger than 5 degrees and equal to or smaller than 30 degrees, for example. The third wall 12c in the side wall 12 including the second convex-bending portion 15a forms a perpendicular surface or inclination surface inclined from the normal direction of the top plate 11 by an angle equal to or larger than 0 degrees and equal to or smaller than 15 degrees, for example.

The first wall 12a in the side wall 12 including the first concave-bending portion 14b forms a perpendicular surface or inclination surface inclined from the normal direction of the top plate 11 by an angle equal to or larger than 0 degrees and equal to or smaller than 15 degrees, for example. The second wall 12b in the side wall 12 including the first concave-bending portion 14b forms an inclination surface inclined from the normal direction of the top plate 11 by an angle equal to or larger than 5 degrees and equal to or smaller than 30 degrees, for example. Similarly, the second wall 12b in the side wall 12 including the second concave-bending portion 15b forms a perpendicular surface or inclination surface inclined from the normal direction of the top plate 11 by an angle equal to or larger than 0 degrees and equal to or smaller than 15 degrees, for example. The third wall 12c in the side wall 12 including the second concave-bending portion 15b forms an inclination surface inclined from the normal direction of the top plate 11 by an angle equal to or larger than 5 degrees and equal to or smaller than 30 degrees, for example.

Preferably, a plurality of the side walls 12 further include thin thickness portions 16 formed at locations where the first bending portion 14 and the second bending portion 15 are formed, as illustrated in FIG. 4 and FIG. 5. An inner wall part of the thin thickness portion 16 is hollowed. The thin thickness portions 16 may be formed at only one of the first bending portion 14 and the second bending portion 15. Preferably, the first bending portion 14 and the second bending portion 15 are formed perimetrically over a plurality of the side walls 12 so as to be substantially parallel to the top plate 11 (the deviation from being parallel ranges from −10 to +10 degrees, for example).

Figure 13:
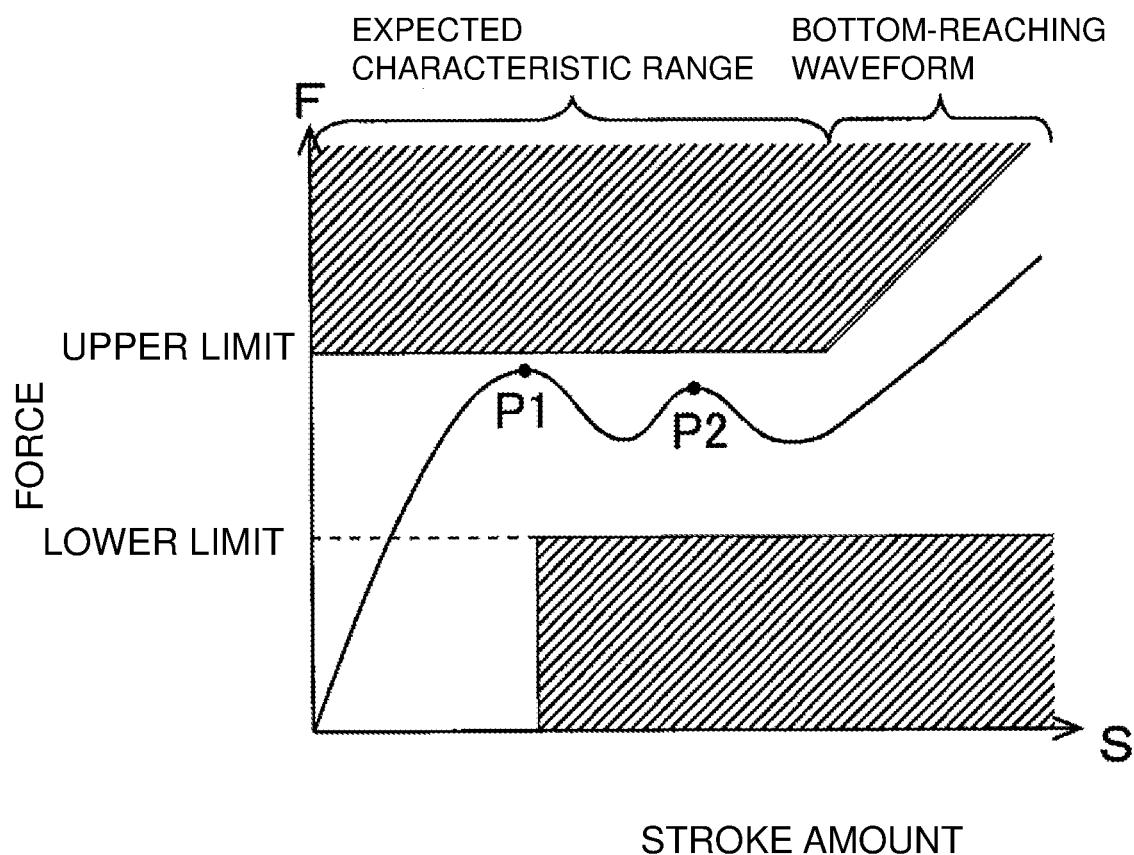
FIG. 13 represents an ideal F-S characteristic with a three-stage form.
Figure 14:
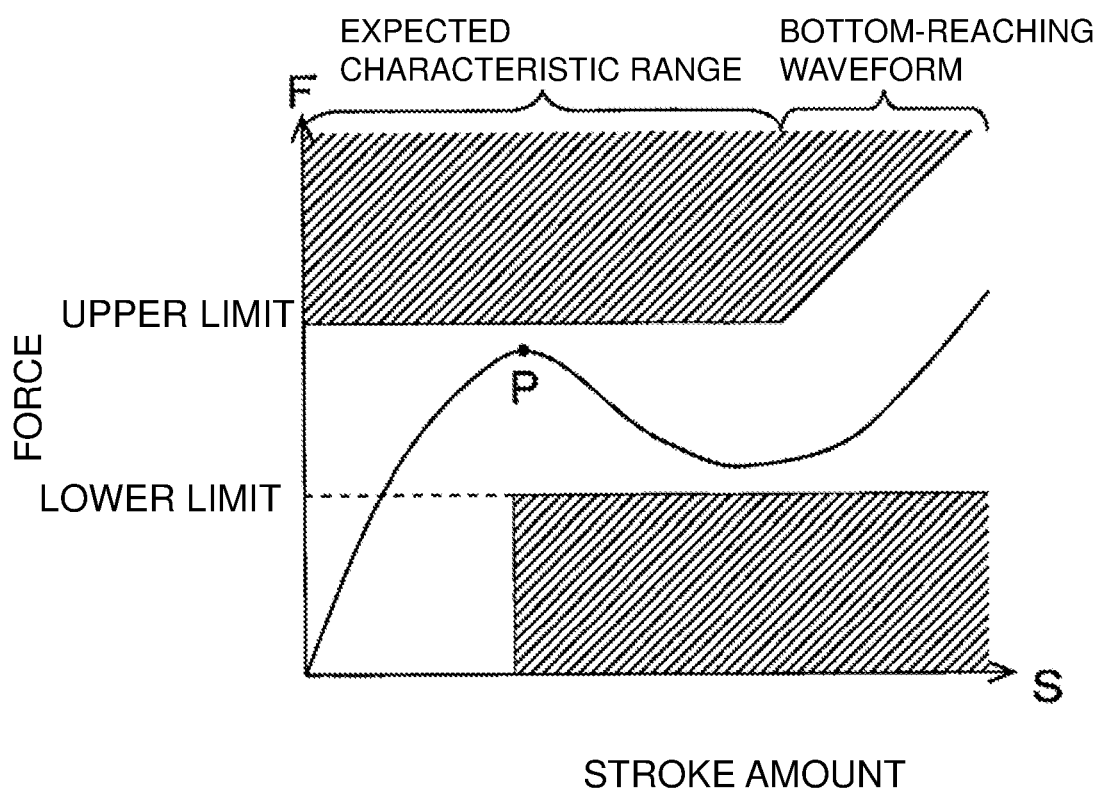
FIG. 14 represents an F-S characteristic of a vehicle cushioning member according to a comparative example.

Here, the vehicle cushioning member 10 including the first bending portion 14 and the second bending portion 15 preferably achieves an F-S characteristic as represented in FIG. 13. FIG. 13 represents an ideal F-S characteristic with a three-stage form. The vehicle cushioning member of the three-stage form can exhibit a high impact-absorption effect at the time of being bent at the first bending portion 14 and at the second bending portion 15. Accordingly, two peaks P1 and P2 can be formed in the F-S characteristic. Thus, the F-S characteristic closer to an upper limit can be achieved to increase its integrated value. The F-S characteristic represented in FIG. 13 is one in the case where at the time of collision, the first bending portion 14 on a side closer to the top plate is first bent, and the second bending portion 15 on a side farther from the top plate is then bent.

However, merely forming first bending portion 14 and the second bending portion 15 in the side walls 12 may result in unintended deformation at the time of impact absorption so that the F-S characteristic as represented in FIG. 13 cannot be achieved.

In this regard, the vehicle cushioning member 10 according to the present embodiment includes a configuration having the following two features in order to achieve the F-S characteristic as represented in FIG. 13.

Figure 6:
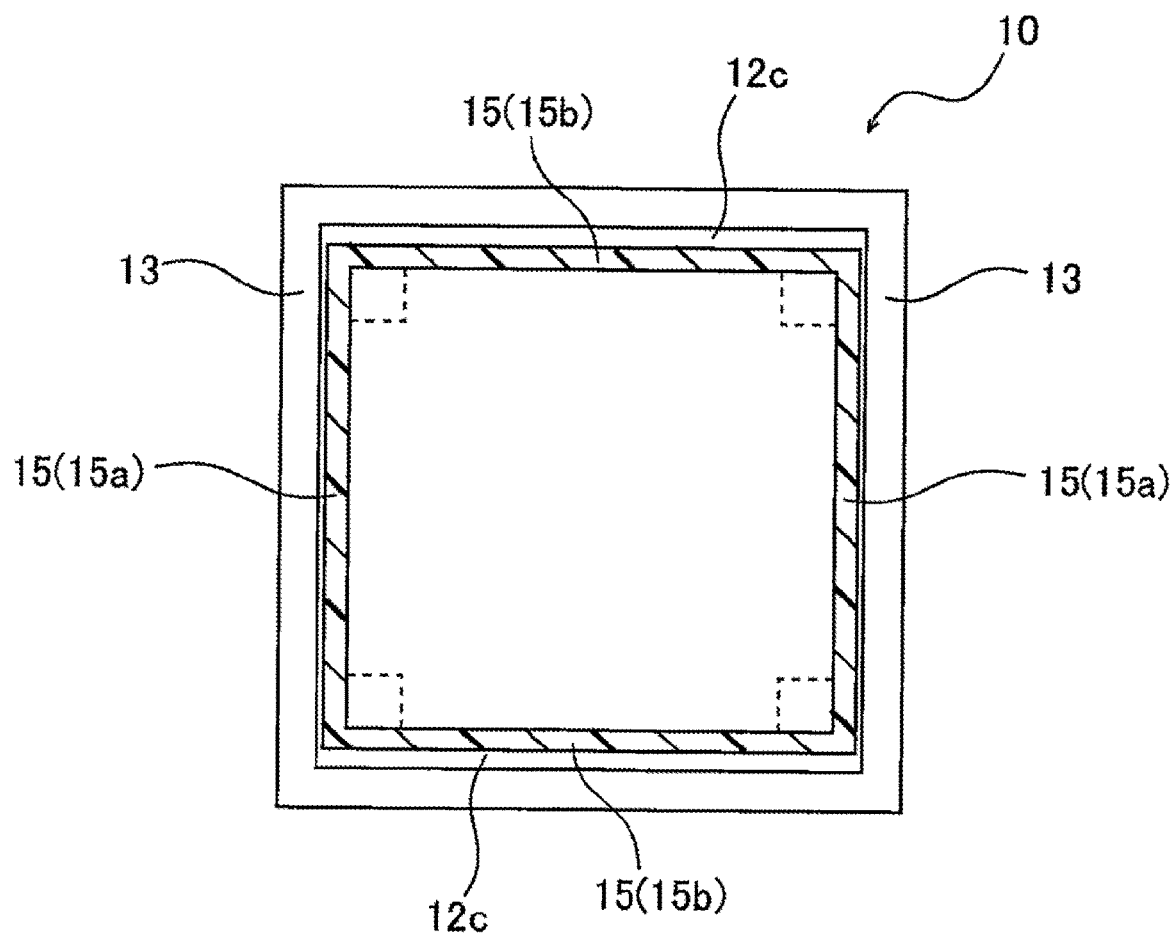
FIG. 6 is a sectional view of the vehicle cushioning member illustrated in FIG. 3, and illustrates a section substantially parallel to a top plate.

FIG. 6 is a sectional view of the vehicle cushioning member 10 illustrated in FIG. 3. FIG. 6 illustrates a section substantially parallel to the top plate 11. FIG. 6 illustrates the section on a plane passing through the second bending portion 15. First, the side walls 12 adjacent to each other on the plane are connected to each other at a substantially right angle (the deviation from being the right angle ranges from −10 to +10 degrees, for example), as represented by the broken lines in FIG. 6.

Secondly, the vehicle cushioning member 10 according to the present embodiment has a height-direction dimensional relation represented by Table 1, concerning the first to third walls 12a to 12c. Table 1 represents the relation of height-direction dimensions of the first to third walls 12a to 12c.

TABLE 1

| First wall | 24% to 47% |
| Second wall | 34% to 49% |
| Third wall | 13% to 33% |

A length from the top surface 11a of the top plate 11 to a surface belonging to the flange portion 13 and positioned on a side of the top plate 11 is assumed to be 100% when viewed in the height direction along the axis of the polygonal tube. In this case, a length (from the top surface 11a to the first bending portion 14) of the first wall 12a is set to be equal to or larger than 24% and equal to or smaller than 47%. A length (from the first bending portion 14 to the second bending portion 15) of the second wall 12b is set to be equal to or larger than 34% and equal to or smaller than 49%. A length (from the second bending portion 15 to the surface belonging to the flange portion 13 and positioned on the side of the top plate 11) of the third wall 12c is set to be equal to or larger than 13% and equal to or smaller than 33%.

The height relation is set as described above so that the first bending portion 14 is bent at an early phase of the collision, and the second bending portion 15 is then bent. As a result, the F-S characteristic represented in FIG. 13 can be achieved.

Figure 7:
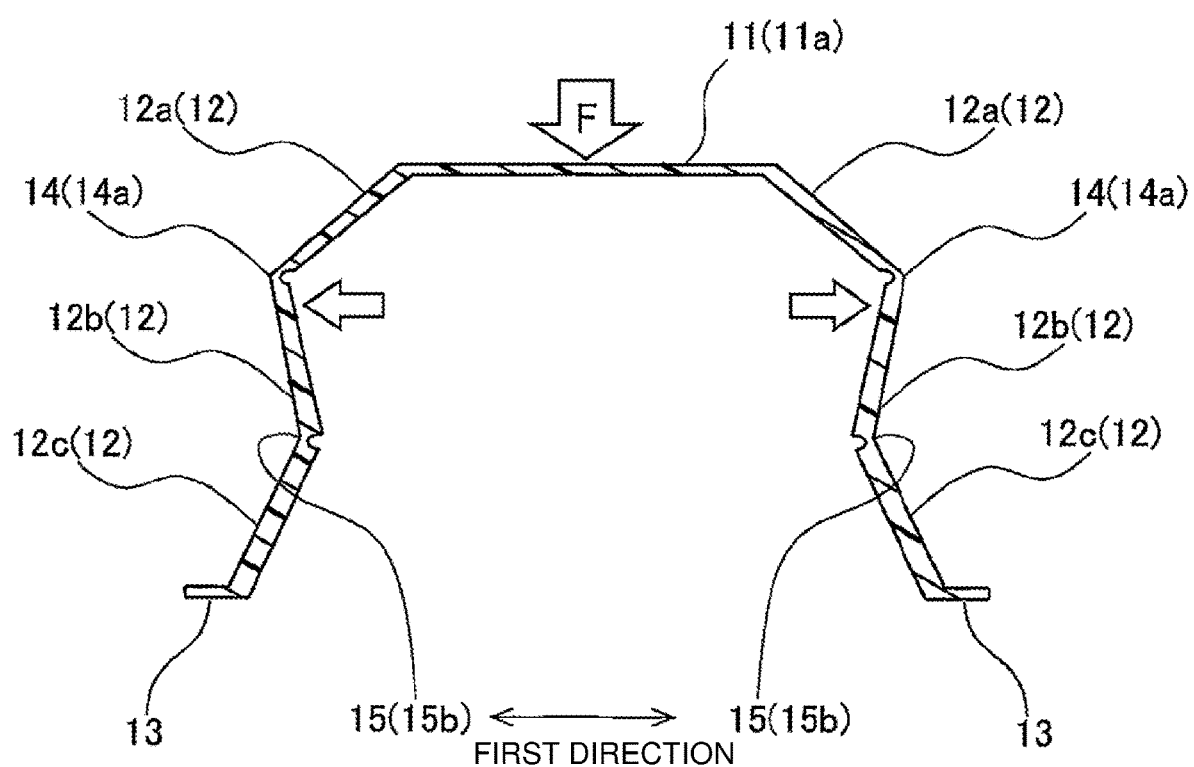
FIG. 7 is a sectional view illustrating one example of a state where collision energy is absorbed by the vehicle cushioning member according to the present embodiment, and illustrates an early phase of collision in a first-direction section.
Figure 8:
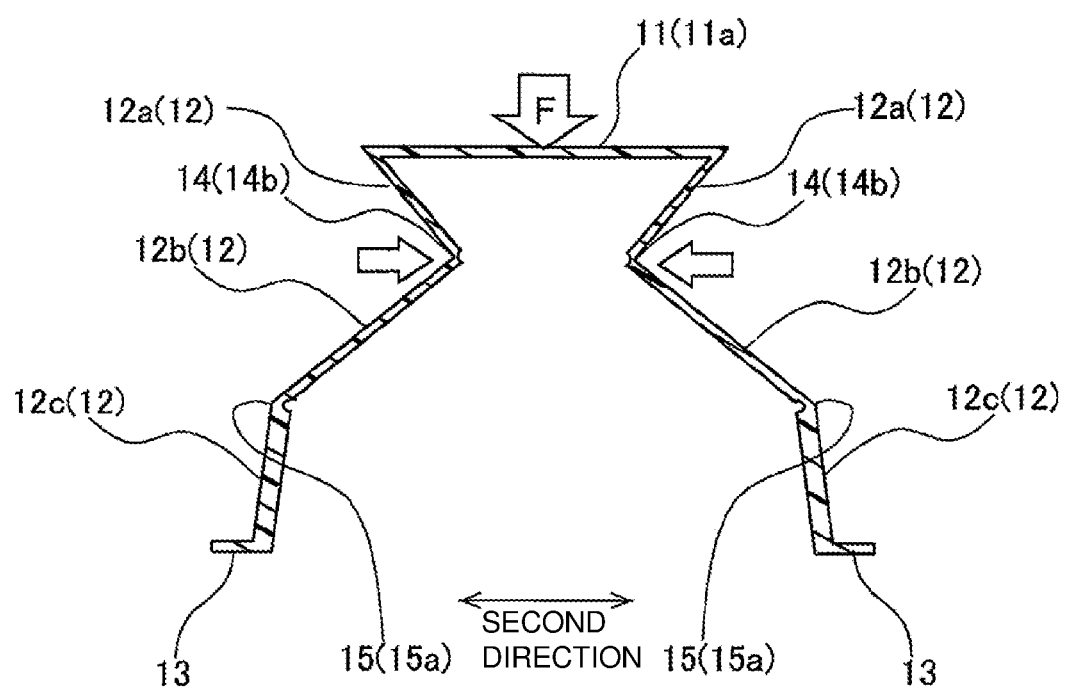
FIG. 8 is a sectional view illustrating one example of a state where collision energy is absorbed by the vehicle cushioning member 10 according to the present embodiment, and illustrates the early phase of the collision in a second-direction section.
Figure 9:
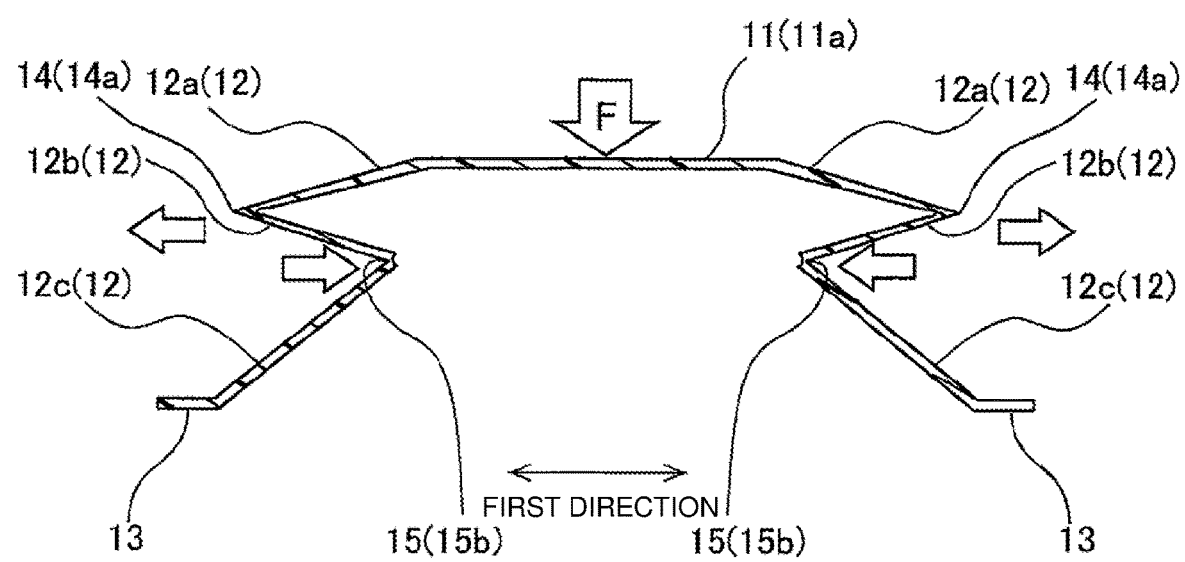
FIG. 9 is a sectional view illustrating one example of a state where collision energy is absorbed by the vehicle cushioning member 10 according to the present embodiment, and illustrates a late phase of collision in a first-direction section.
Figure 10:
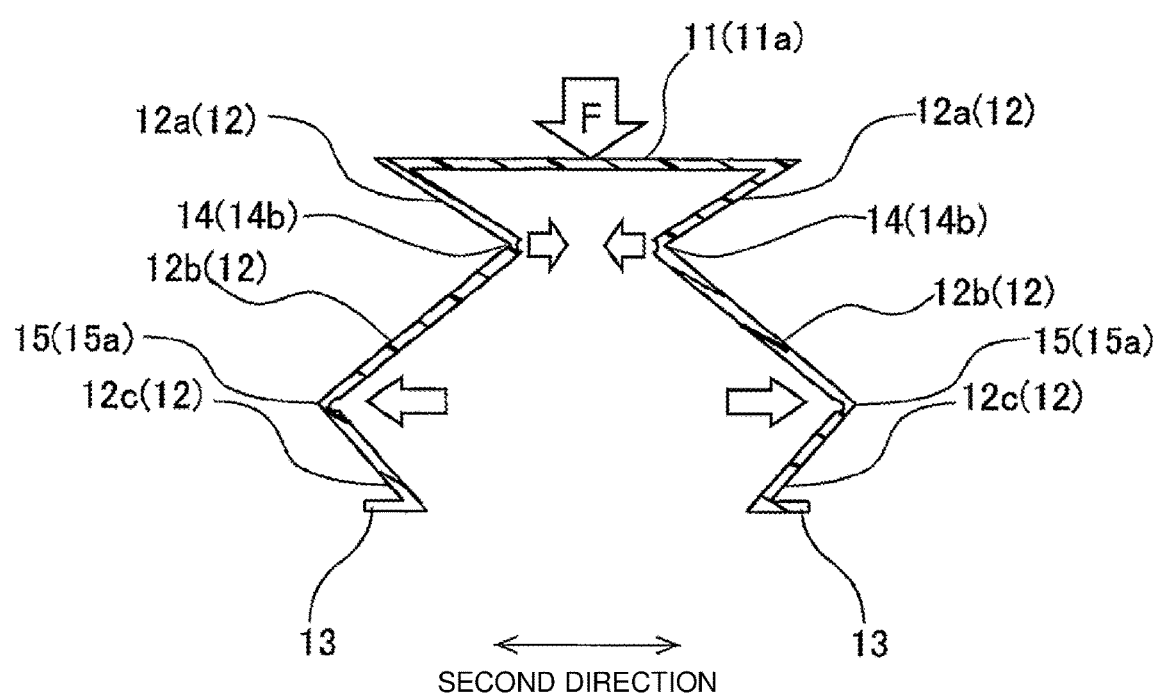
FIG. 10 is a sectional view illustrating one example of a state where collision energy is absorbed by the vehicle cushioning member 10 according to the present embodiment, and illustrates a first example of the late phase of collision in a second-direction section.

Next, description is made on states where collision energy is absorbed by the vehicle cushioning member 10 according to the present embodiment. FIG. 7 to FIG. 10 are sectional views illustrating one example of the states where collision energy is absorbed by the vehicle cushioning member 10 according to the present embodiment. FIG. 7 and FIG. 8 illustrate an early phase of the collision. FIG. 9 and FIG. 10 illustrates a late phase of the collision.

Collision force F is assumed to be applied to the top plate 11 as illustrated in FIG. 7 and FIG. 8 in the first place. In this case, the first bending portion 14 is bent first in the vehicle cushioning member 10. At this time, the second bending portion 15 is in a state of being yet to be substantially bent.

Next, the second bending portion 15 begins to be bent at an intermediate phase of the collision. Thus, it can be said that both of the first bending portion 14 and the second bending portion 15 are being bent at the intermediate phase of the collision.

Then, the first bending portion 14 is completely bent and deformed at the late phase of the collision as illustrated in FIG. 9 and FIG. 10. At this time point, the second bending portion 15 is still being bent.

The vehicle cushioning member 10 according to the present embodiment can cause the first bending portion 14 to be bent, and can then cause the second bending portion 15 to be bent, as described above. Thus, the vehicle cushioning member 10 can cause intended deformation at the time of the collision, and can facilitate achievement of a desired F-S characteristic.

Figure 11:
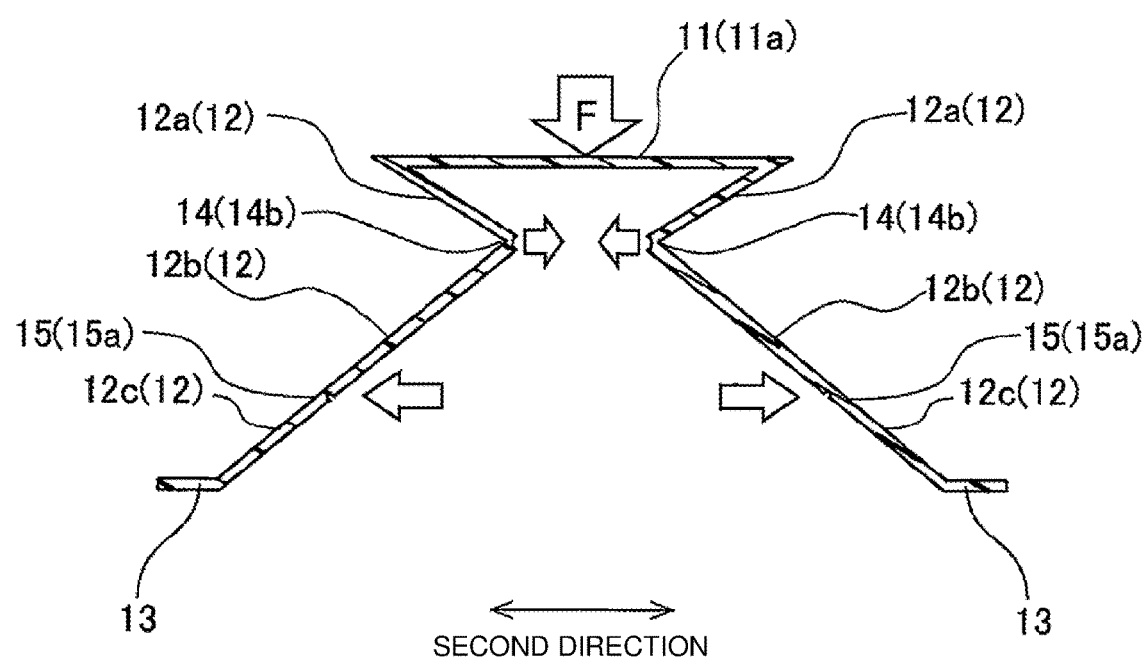
FIG. 11 is a sectional view illustrating one example of a state where collision energy is absorbed by the vehicle cushioning member 10 according to the present embodiment, and illustrates a second example of the late phase of collision in a second-direction section.

The vehicle cushioning member 10 may include a second-direction section as illustrated in FIG. 11, at the late phase of the collision. FIG. 11 is a sectional view illustrating a state where collision energy is absorbed by the vehicle cushioning member 10 according to the present embodiment. FIG. 11 illustrates a second example at the late phase of the collision.

The second bending portion 15 (second convex-bending portion 15a) can fail to be bent convexly in the second-direction section at the late phase of the collision as illustrated in FIG. 11. Even in such a case, the second bending portion 15 (second concave bending portion 15b) is bent concavely in a first-direction section as illustrated in FIG. 9. For this reason, an impact absorption amount is not largely decreased. Even in the case of such deformation, the vehicle cushioning member 10 according to the present embodiment can thus achieve an F-S characteristic relatively close to that illustrated in FIG. 13.

The length from the top surface 11a of the top plate 11 to the surface belonging to the flange portion 13 and positioned on the side of the top plate 11 is assumed to be 100% as described above. In this case, the vehicle cushioning member 10 according to the present embodiment is set as follows. The length from the top surface 11a to the first bending portion 14 is equal to or larger than 24% and equal to or smaller than 47%. The length from the first bending portion 14 to the second bending portion 15 is equal to or larger than 34% and equal to or smaller than 49%. The length from the second bending portion 15 to the surface belonging to the flange portion 13 and positioned on the side of the top plate 11 is equal to or larger than 13% and equal to or smaller than 33%. When the top plate 11 receives the collision force F, such a configuration first causes the first bending portion 14 on the side closer to the top plate 11 to be bent, and then causes the second bending portion 15 on the side farther from the top plate 11 to be bent. Thus, achievement of the ideal F-S characteristic can be facilitated. Therefore, it is possible to provide the vehicle cushioning member 10 capable of securing a larger amount of impact absorption by a smaller stroke amount.

A plurality of the side walls 12 include the thin thickness portions 16 at the locations where the first bending portion 14 and the second bending portion 15 are formed. The inner wall part of the thin thickness portion 16 is hollowed. This enables the first bending portion 14 and the second bending portion 15 to be appropriately and easily bent, thereby reducing a possibility of deformation at an unintended location.

The first bending portion 14 and the second bending portion 15 are formed substantially parallel to the top plate 11. This enables the first bending portion 14 and the second bending portion 15 to be appropriately and easily bent by the collision force F applied to the top plate 11. Thereby, an absorption effect of collision energy can be more stably achieved.

Although the present invention is described above based on the embodiment, the present invention is not limited to the above-described embodiment. Modifications may be added and known or well-known techniques may be combined if possible, without departing from the essence of the present invention. Particularly, shapes and sizes are not limited to the above-described or illustrated matters, and can be appropriately modified without departing from the essence of the present invention.

The top plate 11 is a quadrilateral when viewed in its normal direction in the above-described embodiment, but is not limited particularly to a quadrilateral one as long as the side walls 12 adjacent to each other can be connected to each other at a substantially right angle. For example, the top plate 11 may have a convex shape when viewed in its normal direction, or may have a shape such as an X-shape, an H-shape, or an L-shape.

Figure 12:
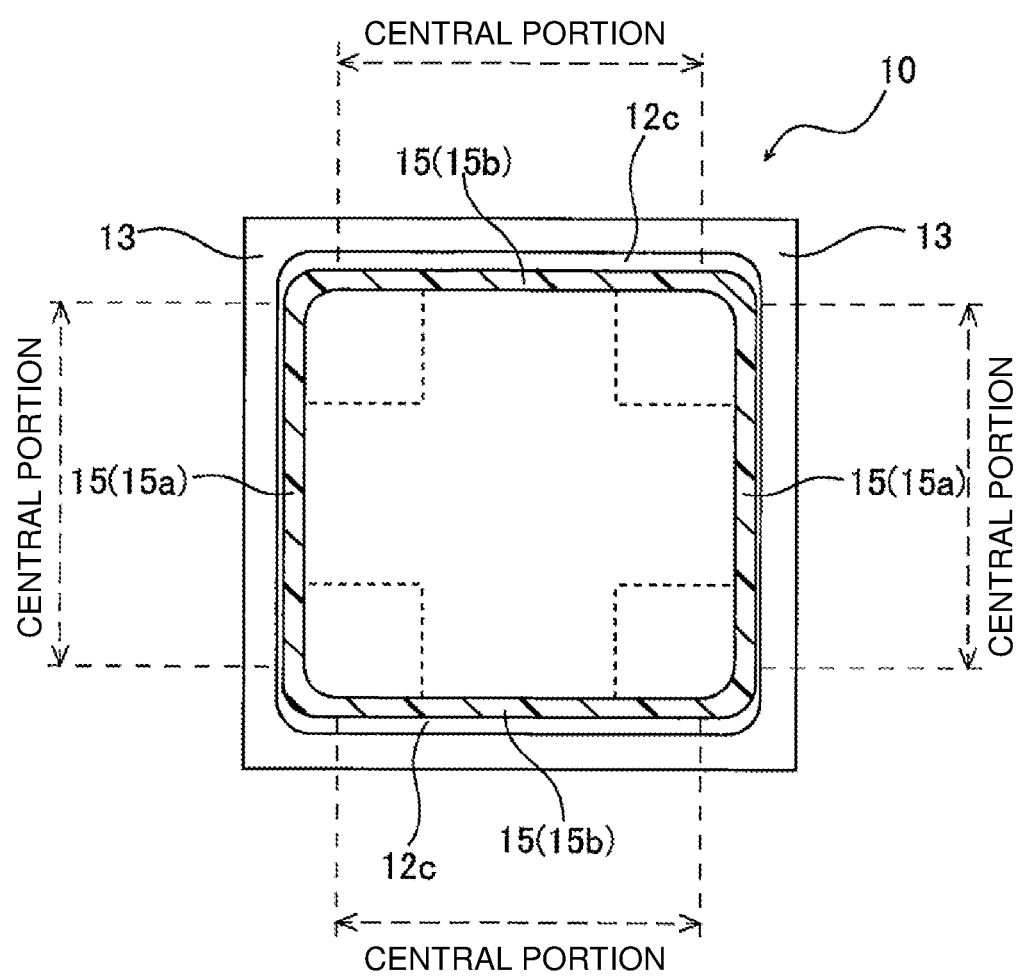
FIG. 12 is a sectional view illustrating a modified example of the vehicle cushioning member according to the present embodiment.

The side walls 12 adjacent to each other in the vehicle cushioning member 10 according to the present embodiment are connected to each other at a substantially right angle in the section substantially parallel to the top plate 11. However, there is no limitation to this, and central portions of the side walls 12 adjacent to each other may be in a relation of being substantially perpendicular to each other in a section substantially parallel to the top plate 11. FIG. 12 is a sectional view illustrating a modified example of the vehicle cushioning member 10 according to the present embodiment. The side walls 12 adjacent to each other may be somewhat rounded at a connection part between them as illustrated in FIG. 12. In other words, the part where the side walls 12 adjacent to each other are connected to each other may be rounded as long as the central portions of the side walls 12 may be in the relation of being substantially perpendicular to each other.

REFERENCE SIGNS LIST

4: Door trim (trim member)
10: Vehicle cushioning member
11: Top plate
11a: Top surface
12: Side wall
13: Flange portion
14: First bending portion
14a: First convex-bending portion
14b: First concave-bending portion
15: Second bending portion
15a: Second convex-bending portion
15b: Second concave-bending portion
16: Thin thickness portion
F: Collision force

The invention claimed is:

1. A vehicle cushioning member having a shape of a substantially polygonal tube and arranged at a back surface of a trim member, the trim member being attached so as to cover a vehicle body panel, the vehicle cushioning member comprising:
a top plate forming a top surface for receiving collision force;
a plurality of side walls that are formed so as to extend from a perimeter edge portion of the top plate and that are arranged perimetrically with respect to the top plate; and
a plate-shaped flange portion projecting outward from respective end portions of the plurality of side walls, the end portions being positioned on an opposite side of the top plate;
wherein the vehicle cushioning member absorbs collision energy when the top plate receives collision force,
wherein the side walls included in the plurality of side walls and adjacent to each other include central portions substantially perpendicular to each other in a section substantially parallel to the top plate,
the plurality of side walls include:
a first bending portion including a first convex-bending portion and a first concave-bending portion, the first convex-bending portion stimulating outward convex bending of the side wall when the top plate receives collision force, the first concave-bending portion stimulating inward concave bending of the side wall when the top plate receives collision force, the first convex-bending portion and the first concave-bending portion being formed perimetrically while switched from each other between the side walls adjacent to each other; and
a second bending portion including a second convex-bending portion and a second concave-bending portion, the second convex-bending portion stimulating outward convex bending of the side wall when the top plate receives collision force, the second concave-bending portion stimulating inward concave bending of the side wall when the top plate receives collision force, the second convex-bending portion and the second concave-bending portion being formed perimetrically while switched from each other between the side walls adjacent to each other,
the first convex-bending portion and the second concave-bending portion are formed at the same side wall, and the first concave-bending portion and the second convex-bending portion are formed at the same side wall,
when a length from the top surface of the top plate to a surface belonging to the flange portion and positioned on a side of the top plate is 100%, a length from the top surface to the first bending portion is set to be equal to or larger than 24% and equal to or smaller than 47%, a length from the first bending portion to the second bending portion is set to be equal to or larger than 34% and equal to or smaller than 49%, and a length from the second bending portion to the surface belonging to the flange portion and positioned on the side of the top plate is set to be equal to or larger than 13% and equal to or smaller than 33%, concerning a height direction along an axis of the substantially polygonal tube.

2. The vehicle cushioning member according to claim 1, wherein the plurality of side walls include a thin thickness portion at one or both of a location where the first bending portion is formed and a location where the second convex-bending portion is formed, an inner wall part of the thin thickness portion being hollowed.

3. The vehicle cushioning member according to claim 1, wherein the first bending portion and the second convex-bending portion formed perimetrically over the plurality of side walls are formed substantially parallel to the top plate.

4. The vehicle cushioning member according to claim 2, wherein the first bending portion and the second convex-bending portion formed perimetrically over the plurality of side walls are formed substantially parallel to the top plate.

* * * * *